United States Patent
Hagino et al.

(10) Patent No.: US 11,530,908 B2
(45) Date of Patent: Dec. 20, 2022

(54) MEASUREMENT POINT DETERMINATION METHOD, NON-TRANSITORY STORAGE MEDIUM, AND MEASUREMENT POINT DETERMINATION APPARATUS

(71) Applicant: MITUTOYO CORPORATION, Kanagawa (JP)

(72) Inventors: Takeshi Hagino, Ibaraki (JP); Yuto Inoue, Ibaraki (JP); Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 180 days.

(21) Appl. No.: 16/558,730

(22) Filed: Sep. 3, 2019

(65) Prior Publication Data

US 2020/0072591 A1 Mar. 5, 2020

(30) Foreign Application Priority Data

Sep. 5, 2018 (JP) .............................. JP2018-165699

(51) Int. Cl.
*G01B 5/008* (2006.01)
*G06F 17/15* (2006.01)

(52) U.S. Cl.
CPC .............. *G01B 5/008* (2013.01); *G06F 17/15* (2013.01)

(58) Field of Classification Search
CPC ........ G01B 5/008; G01B 21/04; G01B 21/20; G06F 17/15
See application file for complete search history.

(56) References Cited

U.S. PATENT DOCUMENTS

| | | | | |
|---|---|---|---|---|
| 4,455,871 A | * | 6/1984 | Vogt | ........................ G01N 3/32 73/579 |
| 7,225,104 B2 | | 5/2007 | Nara et al. | |

(Continued)

FOREIGN PATENT DOCUMENTS

| | | |
|---|---|---|
| CN | 101713645 A | 5/2010 |
| JP | S63-206608 A | 8/1988 |

(Continued)

OTHER PUBLICATIONS

Reading a tape measure easy as 1 2 3 < https://www.bing.com/videos/search?q=READING+A+TAPE+MEASURE+EASY+AS+1+2+3&docid=608038116451500343&mid=C17FDDF346D4EECA7F82C17FDDF346D4EECA7F82&view=detail&FORM=VIRE> dated Aug. 15, 2015. (Year: 2015).*

(Continued)

*Primary Examiner* — Kyle R Quigley
(74) *Attorney, Agent, or Firm* — Greenblum & Bernstein, P.L.C.

(57) ABSTRACT

A measurement point determination method for determining the number or an arrangement of measurement points for a measurement apparatus that performs measurement processing of a measurement item at a plurality of measurement points, the method comprises the steps of acquiring a minimum value and a maximum value of the number of measurement points, acquiring a target value of uncertainty for the measurement item of the measurement apparatus, estimating uncertainties when the measurement item is measured by the measurement apparatus using two or more of the numbers of measurement points between the minimum value and the maximum value of the number of measurement points, and determining the number of measurement points of the measurement apparatus on the basis of the target value and the estimated uncertainties.

8 Claims, 9 Drawing Sheets

(56) References Cited

U.S. PATENT DOCUMENTS

| | | | |
|---|---|---|---|
| 8,306,787 | B2 | 11/2012 | Takamasu et al. |
| 9,335,186 | B2 | 5/2016 | Nara |
| 10,429,166 | B2 | 10/2019 | Nakagawa et al. |
| 2006/0047457 | A1* | 3/2006 | Agapiou ............... G01B 21/04 702/94 |
| 2006/0149507 | A1* | 7/2006 | Nara .................... G01B 21/045 702/185 |
| 2008/0125982 | A1* | 5/2008 | Yoshihiro ............. G01D 18/00 702/53 |
| 2011/0054835 | A1 | 3/2011 | Takamasu et al. |
| 2011/0276303 | A1* | 11/2011 | Marshall .............. G01B 21/047 702/141 |
| 2015/0323300 | A1 | 11/2015 | Briegel et al. |
| 2018/0045511 | A1* | 2/2018 | Georgi .................. G01B 21/04 |
| 2018/0067900 | A1 | 3/2018 | Mos et al. |
| 2019/0187660 | A1 | 6/2019 | Yanaka et al. |
| 2019/0187661 | A1 | 6/2019 | Yanaka et al. |

FOREIGN PATENT DOCUMENTS

| | | |
|---|---|---|
| JP | 2005-066646 A | 3/2005 |
| JP | 2011-047703 A | 3/2011 |
| JP | 4694881 B2 | 6/2011 |
| JP | 2015-215336 A | 12/2015 |
| WO | 2009/141333 A1 | 11/2009 |
| WO | 2016/162231 A1 | 10/2016 |
| WO | 2016/169589 A1 | 10/2016 |

OTHER PUBLICATIONS

Wikihow: How to use a ruler <https://web.archive.org/web/20171004195500/https://www.wikihow.com/Use-a-Ruler> version dated Oct. 4, 2017. (Year: 2017).*

Rookies Lab, Finding Square Root using Guess Check Algorithm, 2013 (Year: 2013).*

Flack, CMM Measurement Strategies, National Physical Laboratory, 2001 (Year: 2001).*

M. Nara et al., "Uncertainty Estimation Using Monte-Carlo Method Constrained by Correlations of the Data," ISMTII, Sep. 2007, pp. 815-818.

"Geometrical Product Specifications (GPS)—Inspection by measurement of products and measuring equipment—Part 1: Acceptance criteria for specifications," Japanese Industrial Standards JIS B0641-1, Mar. 31, 2001 with English translation.

Japanese Office Action (including English Language Translation), dated Jun. 21, 2022, by the Japan Patent Office (JPO), for Japanese Patent Application No. 2018-165699.

Chinese First Office Action (including English Language Translation), dated May 31, 2022, for the Chinese Patent Application No. 2019100925236.

* cited by examiner

MEASUREMENT POINT DETERMINATION METHOD, NON-TRANSITORY STORAGE MEDIUM, AND MEASUREMENT POINT DETERMINATION APPARATUS

CROSS-REFERENCE TO RELATED APPLICATIONS

The present application claims priority to Japanese Patent Applications number 2018-165699, filed on Sep. 5, 2018. The contents of this application are incorporated herein by reference in their entirety.

BACKGROUND OF THE INVENTION

A coordinate measuring machine (CMM) for three-dimensionally measuring a three-dimensional geometry is known. A method (a constrained Monte-Carlo simulation method: CMS method) for estimating uncertainty in a coordinate measurement performed by such a measuring machine on the basis of a simulation using limited data such as specifications of the measuring machine and a pre-measurement evaluation experiment has been known (for example, see Patent Document 1, Japanese Patent No. 4694881, Non-Patent Document 1, M. Nara, et. al., Uncertainty Estimation Using Monte-Carlo Method Constrained by Correlations of the Data, ISMTII 2007, September 24-27. pp. 815-818, and Non-Patent Document 2, Japanese Industrial Standards JIS B0641-1: Geometrical Product Specifications (GPS)—Inspection by measurement of products and measuring equipment—Part 1: Decision rules for proving conformance or nonconformance with specifications.

A measurement point of such a measurement apparatus is a point for setting up a coordinate system on the object to be measured, a point arranged on a surface of the object to be measured, or the like. The greater the number of measurement points of the measurement apparatus, the more the uncertainty in the measurement results is reduced. However, since the measurement time becomes longer as the number of measurement points increases, it has been desired to reduce the number of measurement points while suppressing uncertainty to an allowable range.

BRIEF SUMMARY OF THE INVENTION

This invention focuses on these points, and an object of the present invention is to reduce the number of measurement points while suppressing uncertainty to the allowable range.

A measurement point determination method of the present invention is a measurement point determination method for determining the number or an arrangement of measurement points for a measurement apparatus that performs measurement processing of a measurement item at a plurality of measurement points, the method comprises the steps of acquiring a minimum value and a maximum value of the number of measurement points, acquiring a target value of uncertainty for the measurement item of the measurement apparatus, estimating uncertainties when the measurement item is measured by the measurement apparatus using two or more of the numbers of measurement points between the minimum value and the maximum value of the number of measurement points, and determining the number of measurement points of the measurement apparatus on the basis of the target value and the estimated uncertainties.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Outline of Measuring System S]

Figure 1:
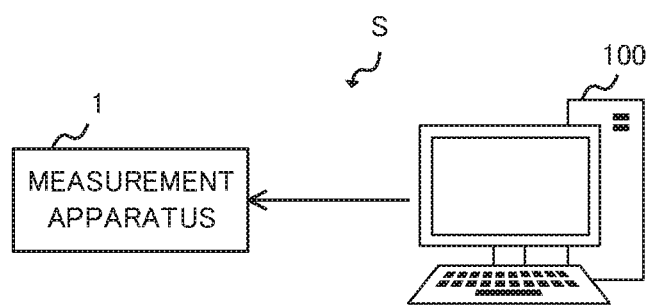
FIG. 1 is a diagram showing an outline of a measuring system S according to the embodiment.

FIG. 1 is a diagram showing an outline of a measuring system S according to the embodiment. The measuring system S includes a measurement apparatus 1 and a measurement point determination apparatus 100. The measurement apparatus 1 is, for example, a coordinate measuring machine (CMM) for measuring a measurement item such as a three-dimensional geometry of an object. The measurement apparatus 1 may be an apparatus other than the CMM as long as it is an apparatus that performs a measurement at a plurality of positions.

The measurement point determination apparatus 100 is an apparatus for determining a measurement point of the measurement apparatus 1, and is, for example, a computer. The measurement point determination apparatus 100 estimates the uncertainty in measurement results for each of the numbers or the arrangements of measurement points of the measurement item, and determines the number or the arrangement of measurement points for which the uncertainty falls within the range of the target value. The measurement point determination apparatus 100, for example, notifies the measurement apparatus 1 of the determined number or the determined arrangement of measurement points, and the measurement apparatus 1 executes a measurement process of the measurement item on the basis of the notified number or the notified arrangement of measurement points. Hereinafter, the operation of the measurement point determination apparatus 100 will be described by exemplifying a circle measurement in which the measurement apparatus 1 measures a geometry of a circular object, but the measurement point determination apparatus 100 according to the embodiment may be applied to a case where the measurement apparatus 1 measures a geometry of an object in a geometry other than a circular geometry.

[Determining Optimal Number of Measurement Points]

Figure 2:
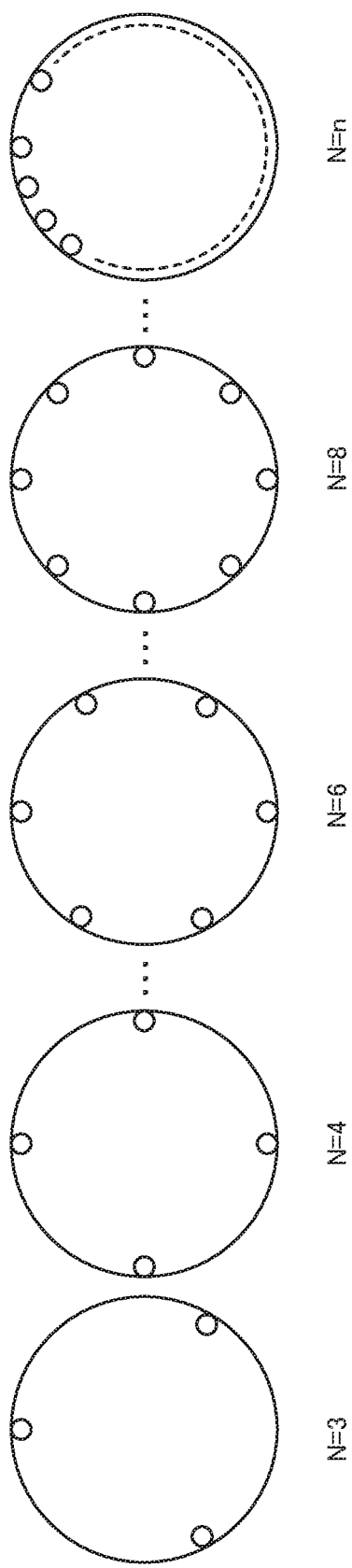
FIG. 2 shows an example of an arrangement of measurement points for a circle measurement according to the embodiment.

FIG. 2 shows an example of the arrangement of measurement points for circle measurement according to the embodiment. FIG. 2 shows an example in which the diameter and/or center coordinates of a circle are measured using a plurality of measurement points. FIG. 2 shows an example in which the number of measurement points N is increased from 3 to n from left to right, and the measurement points are arranged substantially uniformly along the circumference. The measurement apparatus 1 such as the CMM executes the measurement process of the measurement item at such measurement points, and outputs the diameter and the center coordinates of the circle as the measurement results. Estimation results of the uncertainty in the measurement results outputted by the measurement apparatus 1 will be described next.

Figure 3:
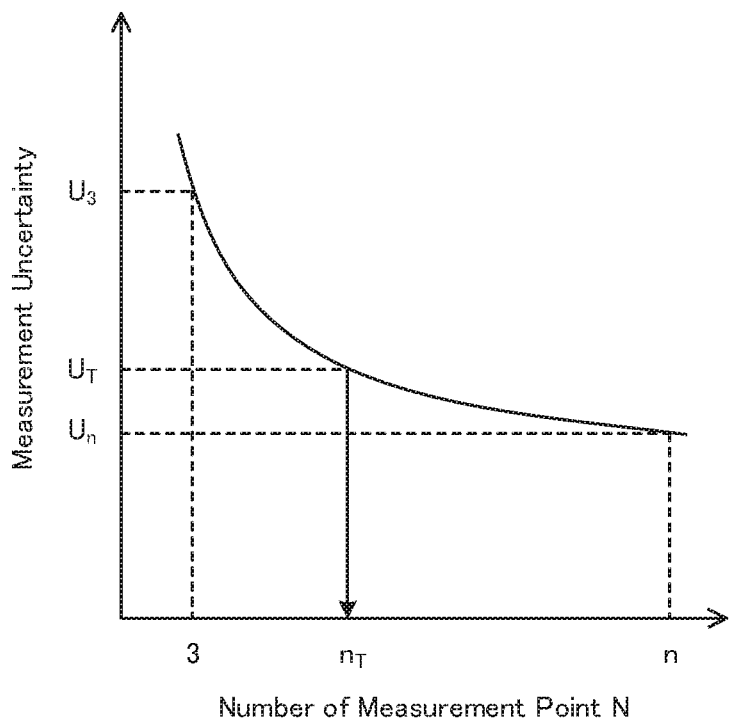
FIG. 3 shows an example of estimation results of uncertainty in the circle measurement with respect to the arrangement of measurement points shown in FIG. 2.

FIG. 3 shows an example of the estimation results of the uncertainty in the circle measurement with respect to the arrangement of measurement points shown in FIG. 2. The horizontal axis of FIG. 3 represents the number of measurement points N, and the vertical axis represents the uncertainty in the circle measurement. The measurement point determination apparatus 100 estimates the uncertainty by performing a simulation using a correlation model of a measurement error that can be calculated for respective distances between the measurement points on the basis of specifications of the measurement apparatus 1. The measurement point determination apparatus 100 estimates the uncertainty by, for example, a known constrained Monte-Carlo simulation method (CMS method), but details of the simulation which may use other methods are omitted. In FIG. 3, the uncertainty with respect to the number of measurement points "3" is defined as $U_3$, and the uncertainty with respect to the number of measurement points "n" is defined as $U_n$. It can be seen in FIG. 3 that the uncertainty in the circle measurement decreases as the number of measurement points N increases. Also, as the number of measurement points N increases, the rate of change in the uncertainty in the circle measurement tends to decrease.

In order to determine the number and the arrangement of measurement points that is optimal for the circle measurement on the basis of the uncertainty with respect to the number of measurement points N, one who makes a decision about the measurement points sets a target value for the uncertainty in the circle measurement to the measurement point determination apparatus 100. In this case, the fewest number of measurement points for which the magnitude of uncertainty falls below the target value is the number of measurement points that is optimal for the circle measurement because it is the smallest number of measurement points that satisfies the target value. In FIG. 3, the target value of uncertainty is denoted by $U_T$, and the number of measurement points denoted by $n_T$ is the fewest number of measurement points for which the uncertainty is below the target value $U_T$. A configuration and an operation of the measurement point determination apparatus 100 for determining the number or the arrangement of measurement points of the measurement apparatus 1 will be described below.

[Configuration of Measurement Point Determination Apparatus 100]

Figure 4:
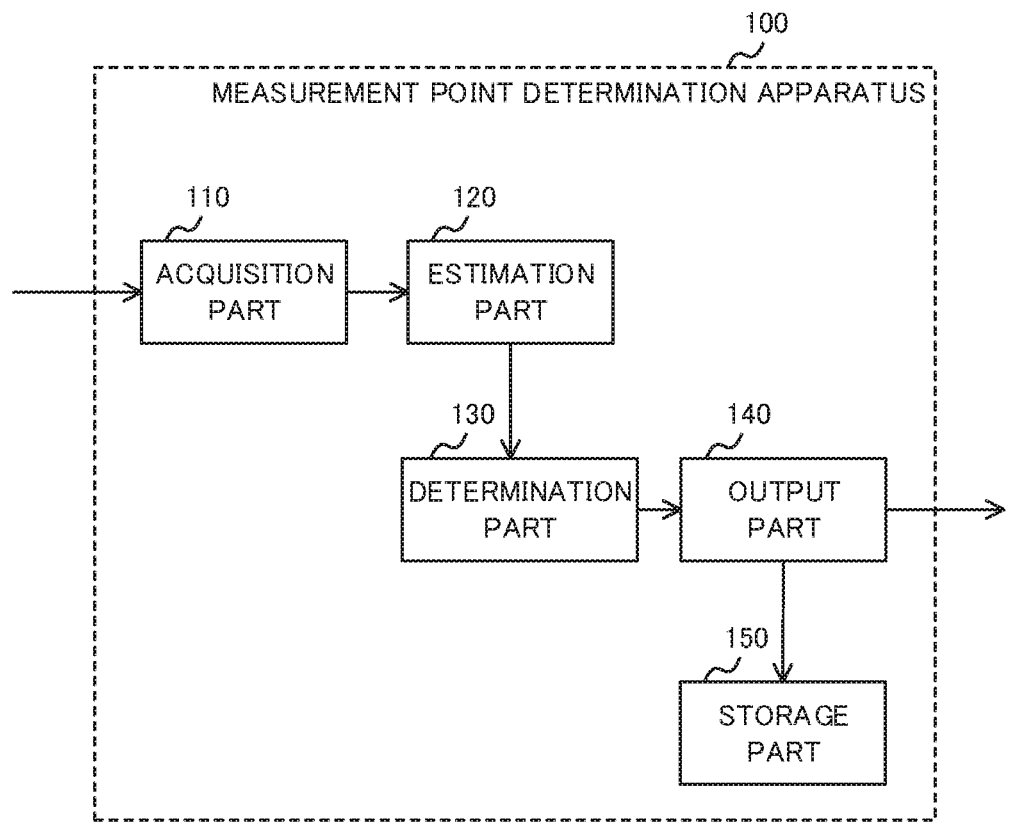
FIG. 4 shows a configuration example of a measurement point determination apparatus 100 according to the embodiment.

FIG. 4 shows a configuration example of the measurement point determination apparatus 100 according to the embodiment. The measurement point determination apparatus 100 determines the number or the arrangement of measurement points of the measurement apparatus 1. The measurement apparatus 1 is an apparatus for performing a measurement such as the CMM that can estimate the uncertainty in measurement results by a simulation. The measurement point determination apparatus 100 includes an acquisition part 110, an estimation part 120, a determination part 130, an output part 140, and a storage part 150.

The acquisition part 110 acquires the minimum value $n_{min}$ and the maximum value $n_{max}$ of the number of measurement points. The acquisition part 110 acquires, for example, an input of the minimum value $n_{min}$ and the maximum value $n_{max}$ from a user. Further, the acquisition part 110 may read data or the like used for determining the measurement point of the measurement apparatus 1 similarly in the past and acquire the similar minimum value $n_{min}$ and the similar maximum value $n_{max}$ from the data.

In addition, the acquisition part 110 acquires the target value of uncertainty $U_T$ of the measurement item of the measurement apparatus 1. The measurement item is, for example, an item that the user wants to measure using the measurement apparatus 1, an item expected to be measured, and the like, and an example of the circle measurement will be described in this embodiment. The acquisition part 110 acquires, for example, the target value of uncertainty $U_T$ from the user. Here, the target value of uncertainty $U_T$ is, for example, a value determined in advance by the user or the like according to the application. Further, for example, as shown in Non-Patent Document 2, the relationship between specifications required for the product and the uncertainty in the measurement is defined for a product inspection or the like. Using such definitions, for example, it is desirable that the target value of uncertainty $U_T$ is determined to be about 1/10 or less of the usage range.

Also, the acquisition part 110 acquires the arrangement of measurement points with respect to the number of measurement points from the user or the like. In this case, the acquisition part 110, for example, acquires the arrangement of measurement points as shown in FIG. 2.

The acquisition part 110 receives an input from the user or the like via, for example, an input device or the like. The input device may be any device as long as it has a function of an input interface. The input device is, for example, a keyboard, a mouse, a touch pad, or a microphone. The acquisition part 110 may receive designated data from a database or the like. For example, the acquisition part 110 is connected to an external database or the like via a network or the like.

The estimation part 120 estimates the uncertainties when the measurement item is measured by the measurement apparatus 1 using two or more of the numbers of measurement points between the minimum value $n_{min}$ and the maximum value $n_{max}$ of measurement points. The estimation part 120 calculates the uncertainty using the known CMS method or the like. For example, the estimation part 120 calculates the uncertainty for each of the numbers of measurement points.

The determination part 130 determines the number of measurement points of the measurement apparatus 1 on the basis of the target value of uncertainty $U_T$ and the estimated uncertainties. The determination part 130 determines, for example, the number of measurement points $n_T$ that is the fewest number of measurement points for which the uncertainty is lower than the target value $U_T$ as the optimal number of measurement points.

The output part 140 outputs the number of measurement points $n_T$ determined by the determination part 130. The output part 140 is connected to, for example, a display or the like, and causes the display or the like to display the number of measurement points $n_T$. Further, the output part 140 outputs the number of measurement points $n_T$ to the measurement apparatus 1. In addition, the output part 140 may output the number of measurement points $n_T$ to the storage part 150.

The storage part 150 stores the number of measurement points $n_T$ received from the output part 140. The storage part 150 may store data and the like acquired by the acquisition part 110. Also, the storage part 150 may store programs executed by the measurement point determination apparatus 100, intermediate data during execution of the programs, and the like.

At least a part of the measurement point determination apparatus 100 described above may be, for example, configured by a computer or the like. In this case, the computer or the like functions as the acquisition part 110, the estimation part 120, the determination part 130, the output part 140, and the storage part 150 according to the embodiment by executing, for example, programs or the like. The storage part 150 includes, for example, a read only memory (ROM) storing a basic input output system (BIOS) or the like of a computer or the like, and a random access memory (RAM) serving as work areas. The storage part 150 may store various pieces of information including an operating system (OS), application programs, and/or a database to be referred to at the time of executing the application programs. That is, the storage part 150 may include a mass storage device such as a hard disk drive (HDD) and/or a solid state drive (SSD).

The computer includes a processor such as a central processing unit (CPU), and functions as at least a part of the acquisition part 110, the estimation part 120, the determination part 130, and the output part 140 by executing programs stored in the storage part 150. The computer may further include a graphics processing unit (GPU) or the like. An operation of the measurement point determination apparatus 100 as described above will be described below.

[First Example of Operation of Measurement Point Determination Apparatus]

Figure 5:
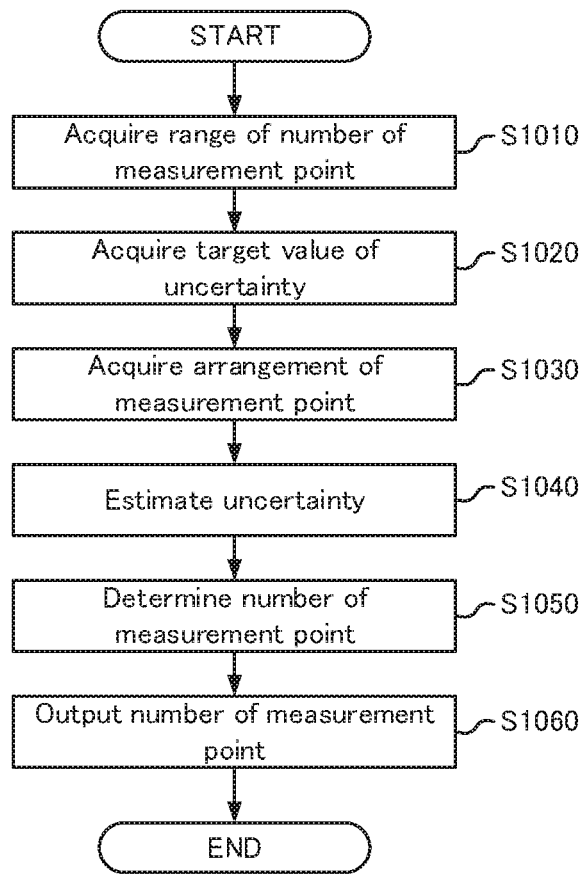
FIG. 5 shows a flowchart illustrating a first example of an operation of the measurement point determination apparatus 100 according to the embodiment.

FIG. 5 is a flowchart illustrating a first example of an operation of the measurement point determination apparatus 100 according to the embodiment. The measurement point determination apparatus 100 determines the number of measurement points $n_T$ that is optimal for the measurement apparatus 1 by executing the operations from steps S1010 to S1060 of FIG. 5. Here, the operation in which the measurement point determination apparatus 100 determines the measurement point of the circle measurement shown in the example of FIG. 3 is described.

First, in step S1010, the acquisition part 110 acquires a range of the number of measurement points to be used by the measurement apparatus 1. For example, the acquisition part 110 stores the acquired minimum value $n_{min}$ of the number of measurement points and the acquired maximum value $n_{max}$ of the number of measurement points in the storage part 150.

Next, in step S1020, the acquisition part 110 acquires the target value of uncertainty $U_T$ of the measurement item of the measurement apparatus 1. For example, the acquisition part 110 stores the acquired target value $U_T$ in the storage part 150.

Next, in step S1030, the acquisition part 110 acquires the arrangement of measurement points for each of the numbers of measurement points. The acquisition part 110 acquires the arrangement of measurement points with respect to each of the numbers of measurement points between the minimum value $n_{min}$ and the maximum value $n_{max}$. The acquisition part 110 acquires the arrangement as shown in FIG. 2 in which the measurement points are arranged substantially uniformly along the circumference with respect to the numbers of measurement points between the minimum value $n_{min}$ and the maximum value $n_{max}$.

The acquisition part 110 acquires, for example, a position of measurement points on the circumference and a designation from the user such as arranging the measurement points at equal intervals. In this case, the acquisition part 110 may acquire the arrangement of measurement points on the circumference as data such as coordinates, or may instead convert the position of measurement points designated by the user into data such as coordinates. The acquisition part 110 stores, for example, the acquired information on the arrangement of measurement points in the storage part 150.

Next, in step S1040, the estimation part 120 estimates the uncertainties when the measurement item is measured by the measurement apparatus 1 using all of the numbers of measurement points between the minimum value $n_{min}$ and the maximum value $n_{max}$ of the number of measurement points. The estimation part 120 calculates the uncertainty $U_n$ with respect to the number of measurement points n as shown in FIG. 3. The estimation part 120 calculates the respective uncertainties lying between the uncertainty $U_{nmin}$ and the uncertainty $U_{nmax}$ with respect to the numbers of measurement points between the minimum value $n_{min}$ and the maximum value $n_{max}$. The estimation part 120 stores, for example, the estimated uncertainties in the storage part 150.

Next, in step S1050, the determination part 130 determines the number of measurement points $n_T$ of the measurement apparatus 1 on the basis of the target value $U_T$ and the estimated uncertainties lying between the uncertainty $U_{nmin}$ and the uncertainty $U_{nmax}$. The determination part 130 determines the fewest number of measurement points for which the uncertainty falls below the target value $U_T$ as the number of measurement points $n_T$ of the measurement apparatus 1.

Next, in step S1060, the output part 140 outputs the number of measurement points $n_T$ determined by the determination part 130. The output part 140 causes the display or the like to display the number of measurement points $n_T$. The output part 140 may output the number of measurement points $n_T$ to the measurement apparatus 1. The output part 140 may output the number of measurement points $n_T$ to the measurement apparatus 1, for example, after acquiring a result that the user or the like confirmed that the number of measurement points $n_T$ is an appropriate value. In this case, the output part 140 receives the confirmation result of the user or the like from the acquisition part 110. If the user or the like determines that the number of measurement points $n_T$ is not appropriate, it is preferable that the measurement point determination apparatus 100 returns to step S1010 and determines the number of measurement points $n_T$ in a different condition.

As described above, the measurement point determination apparatus 100 may determine the number of measurement points $n_T$ that is optimal for the measurement of the measurement apparatus 1. The measurement point determination apparatus 100 can determine the optimal number and the optimal arrangement of measurement points regardless of the user's experience or the like. In addition, the measurement point determination apparatus 100 can determine the optimal number and the optimal arrangement of measurement points independently of the measurement apparatus 1.

As described above, the measurement point determination apparatus 100 according to the embodiment determines the number of measurement points $n_T$ corresponding to the target value of uncertainty $U_T$ after calculating the measurement uncertainty for all of the numbers of measurement points, but the present invention is not limited to this. The measurement point determination apparatus 100 may compare the calculated uncertainty with the target value each time the measurement uncertainty with respect to the number of measurement points is calculated. The operation of such a measurement point determination apparatus 100 will be described below.

[Second Example of Operation of Measurement Point Determination Apparatus]

Figure 6:
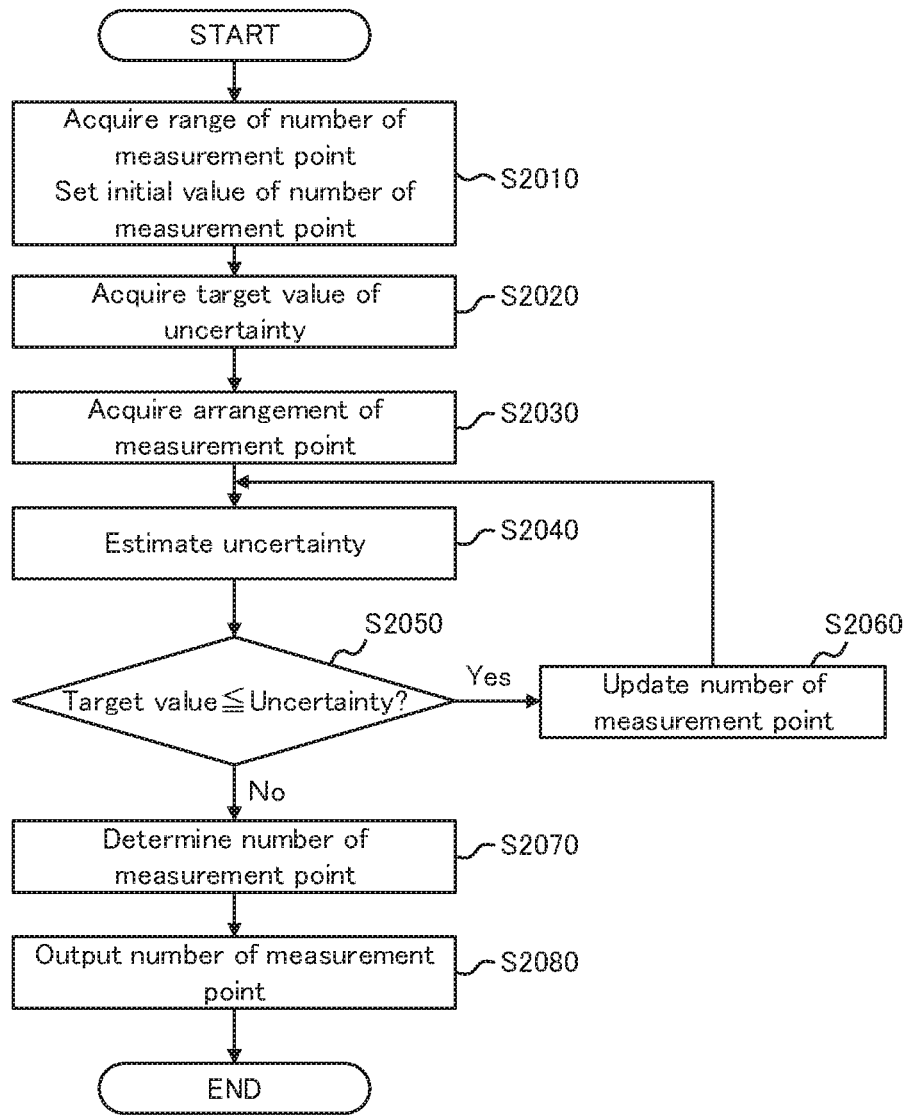
FIG. 6 shows a flowchart illustrating a second example of the operation of the measurement point determination apparatus 100 according to the embodiment.

FIG. 6 shows a flowchart illustrating a second example of the operation of the measurement point determination apparatus 100 according to the embodiment. The measurement point determination apparatus 100 of the second example determines whether to determine the number of measurement points of the measurement apparatus 1 or to continue to estimate the uncertainty with respect to a different number of measurement points each time the uncertainty with respect to one of the plurality of numbers of measurement points is estimated. FIG. 6 illustrates the operation of an example in which the measurement point determination apparatus 100 determines the number of measurement points of the circle measurement, in a similar manner as with the operation shown in FIG. 5.

First, in step S2010, the acquisition part 110 acquires a range of the number of measurement points to be used by the measurement apparatus 1. Next, in step S2020, the acquisition part 110 acquires the target value of uncertainty $U_T$ of the measurement item of the measurement apparatus 1. Next, in step S2030, the acquisition part 110 acquires the arrangement of measurement points for each of the numbers of measurement points. Since the operations from steps S2010 to S2030 have been described with reference to the operations from steps S1010 to S1030 of FIG. 5, their descriptions are omitted here. It should be noted that, in step S2010, the acquisition part 110 sets the initial value of the number of measurement points as the minimum value $n_{min}$ of the number of measurement points.

Next, in step S2040, the estimation part 120 calculates the uncertainty with respect to one of the numbers of measurement points. If the measurement point determination apparatus 100 performs the operation of step S2040 for the first time after starting the operation, the estimation part 120 calculates the uncertainty with respect to the initial value of the number of measurement points.

Next, in step S2050, the determination part 130 compares the calculated uncertainty with the target value $U_T$. If the calculated uncertainty is equal to or greater than the target value $U_T$ (S2050: Yes), the determination part 130 increments the number of measurement points by one and updates the number of measurement points in step S2060. Then, returning to step S2040, the estimation part 120 calculates the uncertainty with respect to the updated number of measurement points. That is, the estimation part 120 and the determination part 130 repeat the operations from step S2040 to step S2060 until the calculated uncertainty becomes smaller than the target value $U_T$.

If the calculated uncertainty is smaller than the target value $U_T$ (S2050: No), the determination part 130 sets the calculated uncertainty as the number of measurement points $n_T$ of the measurement apparatus 1 in step S2070. Next, in step S2080, the output part 140 outputs the number of measurement points $n_T$ determined by the determination part 130. Since the operation of step S2080 has been described with reference to the operation of step S1060 of FIG. 5, the description thereof is omitted here.

As described above, the measurement point determination apparatus 100 can determine the number of measurement points $n_T$ that is optimal for the measurement of the measurement apparatus 1 even if the operation of the second example is executed. Further, in the operation of the second example, since the determination of whether or not to determine the number of measurement points of the measurement apparatus 1 is made every time the uncertainty with respect to one of the numbers of measurement points is estimated, it is possible to determine the optimal number of measurement points in response to the uncertainty falling below the target value. Therefore, the measurement point determination apparatus 100 can omit the calculation for other numbers of measurement points for which the uncertainty is less than the target value, and can efficiently determine the number of measurement points $n_T$.

In the operation of the second example, the example in which the measurement point determination apparatus 100 (i) sets the initial value of the number of measurement points as the minimum value $n_{max}$ of the number of measurement points, (ii) increments the initial value one by one, and (iii) updates the number of measurement points has been described, but the present invention is not limited thereto. Instead, the measurement point determination apparatus 100 may set the initial value of the number of measurement points as the maximum value $n_{max}$ of the number of measurement points and decrement the initial value one by one to and update the number of measurement points.

The example in which the measurement point determination apparatus 100 according to the embodiment increments or decrements the number of measurement points by one has been described above, but the present invention is not limited thereto. The measurement point determination apparatus 100 may estimate the uncertainty by increasing or decreasing the number of measurement points between the minimum value and the maximum value of the number of measurement points at a predetermined first interval of the number of points.

For example, the measurement point determination apparatus 100 increases the number of measurement points by five from the initial value $n_{min}$. In such a case, the determination part 130 of the measurement point determination apparatus 100 may increase the number of measurement points by five and update the number of measurement points in step S2060 of FIG. 6. The measurement point determination apparatus 100 may more efficiently determine the number of measurement points $n_T$ by incrementing or decrementing the number of measurement points by a predetermined number.

The measurement point determination apparatus 100 may update the number of measurement points using a second interval of the number of points that is smaller than the first interval of the number of points after the uncertainty calculated by updating the number of measurement points using the first interval of the number of points becomes less than the target value. For example, as described in step S2060 of FIG. 6, the measurement point determination apparatus 100 updates the number of measurement points by increasing the number of measurement points by the first interval of the number of points. Then, if the uncertainty calculated using the updated number of measurement points becomes smaller than the target value $U_T$, the measurement point determination apparatus 100 further updates the number of measurement points by decreasing the number of measurement points by the second interval of the number of points. Then, if the uncertainty calculated using the updated number of measurement points becomes equal to or larger than the target value $U_T$, the measurement point determination apparatus 100 sets the number of measurement points before the update as the number of measurement points $n_T$ of the measurement apparatus 1.

In this manner, each time the uncertainty for one of the plurality of numbers of measurement points is estimated, the measurement point determination apparatus 100 determines whether to (i) continue the estimation of the uncertainty for a further different number of measurement points using the first interval of the number of points or to (ii) continue the estimation of the uncertainty for a further different number of measurement points using the second interval of the number of points, which is smaller than the first interval of the number of points. Here, the determination part 130 updates the number of measurement points using the first interval of the number of points until the uncertainty becomes smaller than the target value $U_T$, and updates the number of measurement points using the second interval of the number of points after the uncertainty becomes smaller than the target value $U_T$.

Then, the measurement point determination apparatus 100 estimates the uncertainty by increasing or decreasing the previous number of measurement points using the determined interval. For example, in a case where the determination part 130 updates the number of measurement points by incrementing the number of measurement points by five (the first interval of the number of points), the determination part 130 updates the number of measurement points by decrementing the number of measurement points by one (the second interval of the number of points) after the uncertainty becomes less than the target value $U_T$. Alternatively, in a case where the determination part 130 updates the number of measurement points by decrementing the number of measurement points by five (the first interval of the number of points), the determination part 130 may update the number of measurement points by incrementing the number of measurement points by one (the second interval of the number of points) after the uncertainty becomes smaller than the target value $U_T$.

The example in which the measurement point determination apparatus 100 according to the embodiment increments and decrements the number of measurement points at two types of intervals has been described above, but the present invention is not limited thereto. The measurement point determination apparatus 100 may estimate the uncertainty by increasing or decreasing the number of measurement points from the minimum value to the maximum value at intervals of three or more. As a result, the measurement point determination apparatus 100 can determine the number of measurement points $n_T$ more efficiently.

Further, as described above, the example in which the measurement point determination apparatus 100 according to the embodiment increments and decrements the number of measurement points has been described, but the present invention is not limited thereto. The measurement point determination apparatus 100 may determine the number of measurement points $n_T$ by specifying the relationship of the uncertainty to the number of measurement points. As shown in FIG. 3, the relationship of the uncertainty to the number of measurement points often tends to be monotonically decreasing or monotonically increasing. Therefore, by calculating each uncertainty for two or more of the numbers of measurement points, the relationship of the uncertainty to the number of measurement points may be specified. The operation of such measurement point determination apparatus 100 will be described below.

[Third Example of Operation of Measurement Point Determining Apparatus]

Figure 7:
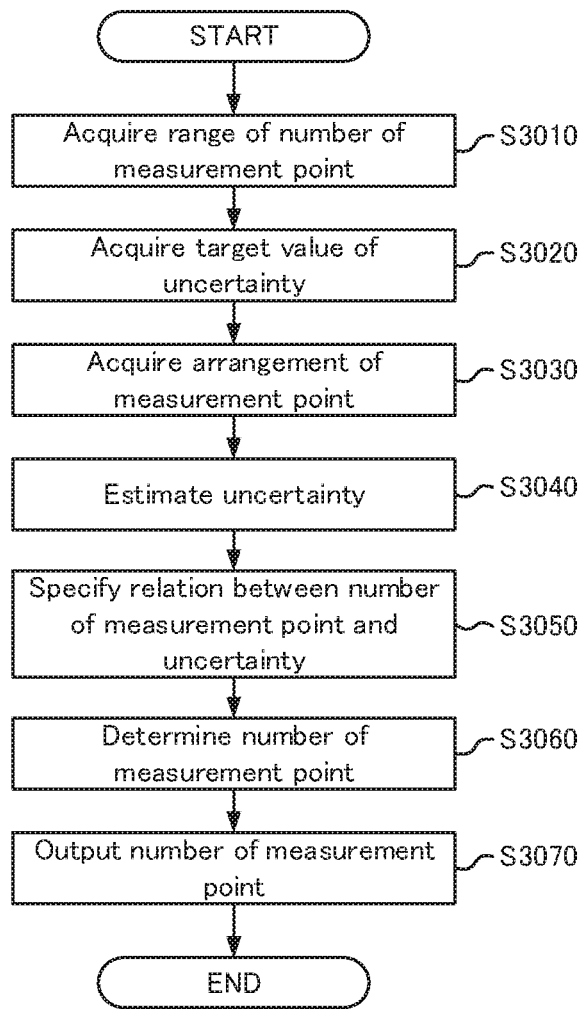
FIG. 7 shows a flowchart illustrating a third example of the operation of the measurement point determination apparatus 100 according to the embodiment.

FIG. 7 shows a flowchart illustrating a third example of the operation of the measurement point determination apparatus 100 according to the embodiment. FIG. 7 illustrates the operation of an example in which the measurement point determination apparatus 100 determines the measurement point for the circle measurement, in a similar manner as with the operation shown in FIGS. 5 and 6.

First, in step S3010, the acquisition part 110 acquires a range of the number of measurement points to be used by the measurement apparatus 1. Next, in step S3020, the acquisition part 110 acquires target value of uncertainty $U_T$ of the measurement item of the measurement apparatus 1. Next, in step S3030, the acquisition part 110 acquires the arrangement of measurement points for each of the numbers of measurement points. Since the operations from step S3010 to step S3030 have been described with reference to the operations from step S1010 to step S1030 of FIG. 5, their descriptions are omitted here.

Next, in step S3040, the estimation part 120 estimates two or more uncertainties with respect to two or more of the numbers of measurement points that are different from each other among the numbers of measurement points between the minimum value $n_{min}$ and the maximum value $n_{max}$ of the number of measurement points. For example, the estimation part 120 calculates the uncertainty $U_{nm}$ of the predetermined number (m pieces) of measurement points $n_{nm}$. The estimation part 120 may divide the numbers of measurement points between the minimum value $n_{min}$ and the maximum value $n_{max}$ by a predetermined number of partitions (m−1) to calculate the uncertainty $U_{nm}$ for the number (m pieces) of measurement points $n_{nm}$. Here, m is preferably 3 or more, and more preferably 5 or more. For example, the estimation part 120 stores the estimated uncertainty in the storage part 150.

Next, in step S3050, the determination part 130 specifies a relationship between the number of measurement points and the uncertainty on the basis of two or more of the uncertainties with respect to two or more of the numbers of measurement points. The determination part 130 calculates the relational expression $U_n(n)$ of the uncertainty $U_n$ with respect to the number of measurement points n by using, for example, the least squares method or the like.

Next, in step S3060, the determination part 130 determines the number of measurement points $n_T$ of the measurement apparatus 1 that satisfies the target value $U_T$ by using the specified relation. For example, the determination part 130 calculates a real number r that becomes $U_T=U_n(r)$ if the relational expression $U_n(n)$ is a monotonically decreasing function, and determines the smallest natural number equal to or larger than r as the number of measurement points $n_T$ of the measurement apparatus 1. In the relational expression $U_n(n)$, the real number r may be calculated by an interpolation operation, or may be calculated by an extrapolation operation instead.

Next, in step S3070, the output part 140 outputs the number of measurement points $n_T$ determined by the determination part 130. Since the operation of step S3070 has been described with reference to the operation of step S1060 of FIG. 5, the description thereof is omitted here.

As described above, the measurement point determination apparatus 100 may determine the number of measurement points $n_T$ that is optimal for the measurement of the measurement apparatus 1 even if the operation of the third example is executed. In the operation of the third example, since the number of measurement points of the measurement apparatus 1 is determined from the relation of the uncertainties to two or more of the numbers of measurement points, the optimal measurement points may be determined more efficiently.

In the operation of the third example, an example in which the measurement point determination apparatus 100 calculates the number of measurement points $n_T$ from the relational expression $U_n(n)$ of the number of measurement points and the uncertainty has been described. In addition, the measurement point determination apparatus 100 may further check whether or not the number of measurement points $n_T$ calculated from the relational expression satisfies the target value $U_T$.

For example, after step S3060 of the operation of the third example, the estimation part 120 estimates the uncertainty with respect to the number of measurement points $n_T$ of the measurement apparatus 1 determined by the determination part 130. Then, the determination part 130 compares the uncertainty calculated by the estimation part 120 with the target value $U_T$, and confirms that the estimated uncertainty satisfies the target value $U_T$. If the target value $U_T$ is smaller than the calculated uncertainty, the determination part 130 may repeat the updating of the number of measurement points and the comparing of the uncertainty and the target value $U_T$ until the uncertainty becomes less than the target value $U_T$.

As described above, an example in which the measurement point determination apparatus 100 according to the embodiment determines the number of measurement points of the measurement apparatus 1 by determining the arrangement of measurement points in advance and calculating the uncertainty with respect to the number of measurement points has been described, but the present invention is not limited thereto. Alternatively or in addition thereto, the measurement point determination apparatus 100 may determine the number or the arrangement of measurement points of the measurement apparatus 1 by calculating the uncertainty when the arrangement of measurement points is changed.

[Fourth Example of Operation of Measurement Point Determination Apparatus]

A measurement point of the measurement apparatus 1 may have a different effect on prediction results of the uncertainty depending on the position at which it is arranged. Therefore, there is a high possibility that a measurement point having a small influence on the prediction results of the uncertainty may be deleted. In addition, the arrangement may be changed so that the measurement point having a small influence on the prediction results of the uncertainty becomes a measurement point having a large influence on the prediction results of uncertainty. An example in which the measurement point determination apparatus 100 determines the number or the arrangement of measurement points in consideration of the influence on the uncertainty for each arrangement of measurement points will be described next.

Figure 8:
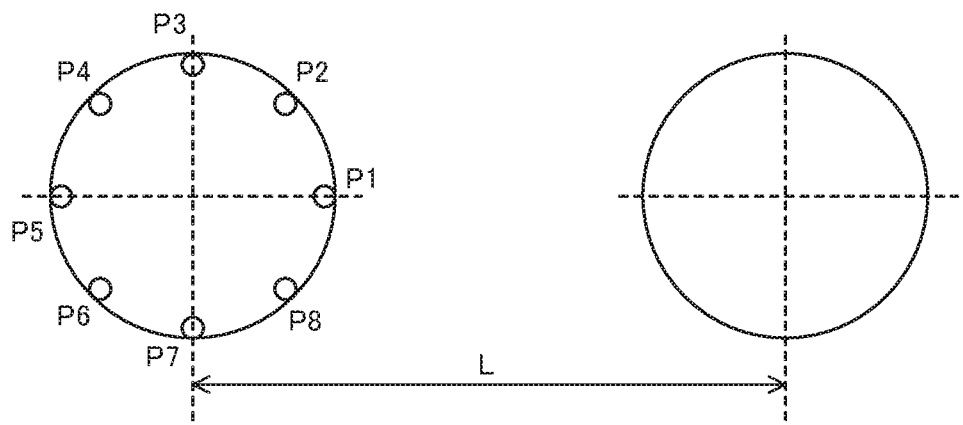
FIG. 8 shows an example of the arrangement of measurement points in a measurement of a distance between centers of circles according to the embodiment.

FIG. 8 shows an example of the arrangement of measurement points in a measurement of a distance between centers of circles according to the embodiment. FIG. 8 shows an example of a measurement item which is a center-to-center distance L between the two circles to be measured by the measurement apparatus 1. In this instance, the measurement apparatus 1 detects the positions of eight measurement points P1 to P8 obtained by dividing the circumference of one of the circles into equal intervals. For example, the measurement apparatus 1 calculates an equation of the position coordinates of one of the circles from the detected positions of the eight measurement points P1 to P8 by using the least squares method or the like. As a result, the measurement apparatus 1 may calculate the center coordinates of the circles, and therefore, may calculate the distance L between the centers from the difference between the center coordinates and the center coordinates similarly calculated from the other circle.

The measurement point determination apparatus 100 may calculate the uncertainty with respect to the measurement item of the measurement apparatus 1. The measurement point determination apparatus 100 calculates the uncertainty in the measurement of the center-to-center distance L using, for example, the eight measurement points P1 to P8 by the measurement apparatus 1, and sets the calculation results as M.

Here, for example, a position obtained by moving the position of the measurement point P1 by $\Delta p_1$ is defined as the measurement point P1'. For example, $\Delta p_1$ is a vector value which is changed by a predetermined distance along a normal vector of a measurement surface. Further, $\Delta p_1$ may be a vector value that changes at least one of the X, Y, and Z coordinates by a predetermined distance. It is preferable that $\Delta p_1$ is a unit vector.

The calculation results of the uncertainty in the measurement of the center-to-center distance L using the eight measurement points P1' and P2 to P8 is defined as $M_1$. The absolute value of $\Delta M_1/\Delta p_1 = (M_1 - M)/\Delta p_1$ is defined as a sensitivity of the measurement point P1. That is, the sensitivity $\Delta M_1/\Delta p_1$ indicates the degree of the effect on the uncertainty in the measurement if the error of a unit quantity occurs at the measurement point P1. Such sensitivity may also be calculated for other measurement points and compared with each other to determine whether the measurement point should be deleted or moved.

Figure 9:
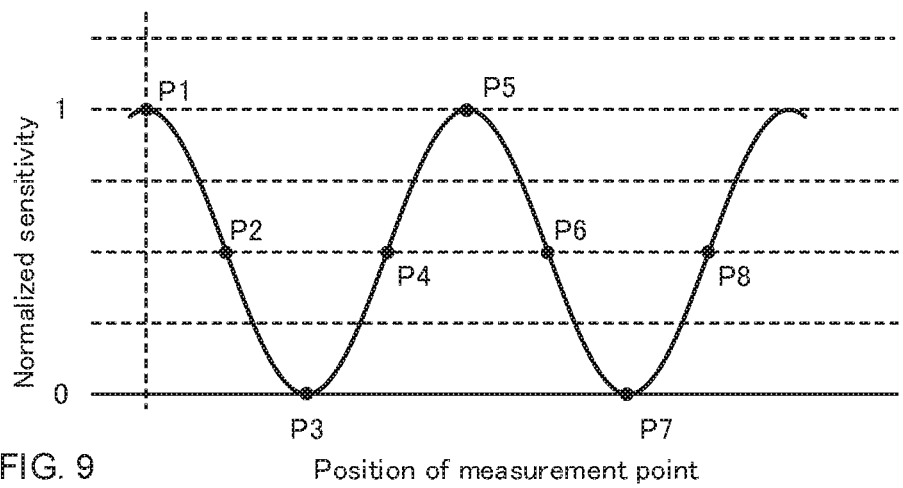
FIG. 9 shows an example of a sensitivity of the center-to-center distance measurement with respect to the arrangement of measurement points shown in FIG. 8.

FIG. 9 shows an example of the sensitivity of the center-to-center distance measurement with respect to the arrangement of measurement points shown in FIG. 8. The horizontal axis of FIG. 9 is an example schematically illustrating the positions of the measurement points P1 to P8 on a straight line. The vertical axis of FIG. 9 illustrates a normalized sensitivity of measurement points $\Delta M_i/\Delta p_i$. The unit quantity $\Delta p_i$ to be added to each measurement point is a unit vector substantially perpendicular to the tangent line of each measurement point arranged on the circumference of the left circle shown in FIG. 8.

The direction substantially perpendicular to tangent lines of the measurement points P1 and P5 substantially coincides with the direction of the center-to-center distance L of the circles measured by the measurement apparatus 1. Therefore, the error occurring at the measurement points P1 and P5 has a relatively large effect on the measurement results, and the sensitivities $\Delta M_1/\Delta p_1$ and $\Delta M_5/\Delta p_5$ are larger than the sensitivities of the other measurement points. On the other hand, the directions substantially perpendicular to the tangent lines of the measurement points P3 and P7 are substantially perpendicular to the direction of the center-to-center distance L of the circles measured by the measurement apparatus 1. Therefore, the error occurring at the measurement points P3 and P7 has a relatively small effect on the measurement results, and the sensitivities $\Delta M_3/\Delta p_3$ and $\Delta M_7/\Delta p_7$ are smaller than the sensitivities of the other measurement points.

From the above, for example, if it is desired to reduce the number of measurement points and minimize worsening of the uncertainty, since the sensitivity of the measurement points P3 and P7 is the minimum, it is understood that the measurement points P3 and P7 are the most suitable candidates as the measurement points to be reduced. Further, for example, if the arrangement of the measurement points is changed, since the sensitivity of the measurement points P1 and P5 is high, it is understood that it is preferable to make the positions of the other measurement points closer to the measurement points P1 and P5. Therefore, the measurement point determination apparatus 100 according to the embodiment further calculates the sensitivity, which is an index of the influence on the uncertainty, for each measurement point, and determines the number or the arrangement of measurement points. The operation of such a measurement point determination apparatus 100 will be described below.

Figure 10:
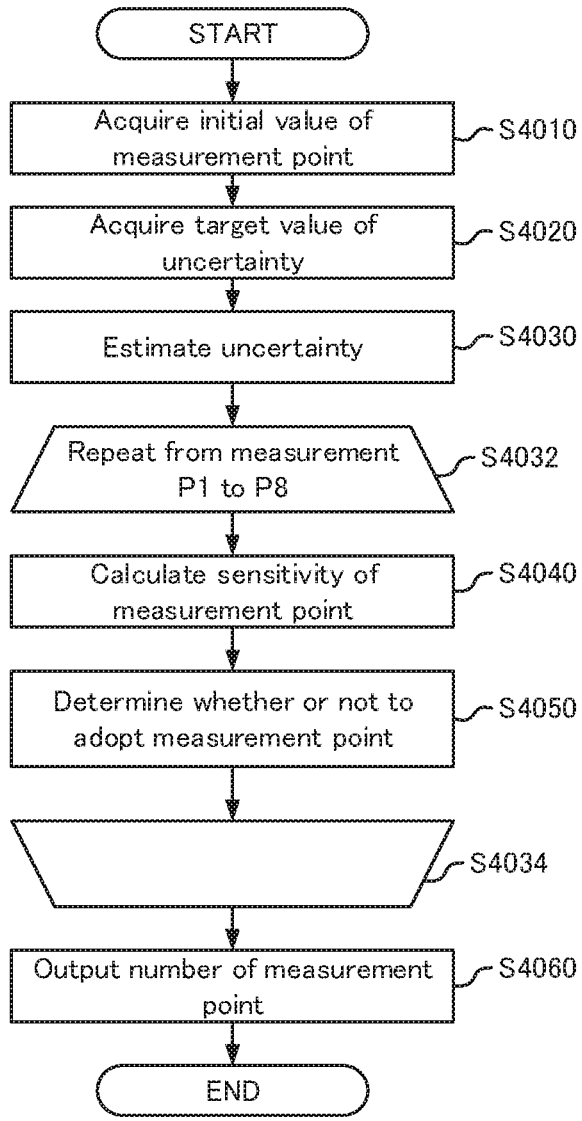
FIG. 10 shows a flowchart illustrating a fourth example of the operation of the measurement point determination apparatus 100 according to the embodiment.

FIG. 10 shows a flowchart illustrating a fourth example of the operation of the measurement point determination apparatus 100 according to the embodiment. FIG. 10 shows an operation for determining the number and the arrangement of measurement points in a case such as shown in FIG. 8 where the measurement point determination apparatus 100 measures the center-to-center distance L of the circles.

First, in step S4010, the acquisition part 110 acquires the initial value of the number and the arrangement of measurement points. For example, the acquisition part 110 acquires information on the eight measurement points P1 to P8 obtained by dividing the circumference of the circle into equal intervals as shown in FIG. 8. The acquisition part 110 receives, for example, the number and the arrangement of measurement points from a user or the like. Further, the acquisition part 110 may receive a designation of whether or not the measurement points are arranged on the circumference and the number of divisions from the user or the like.

Next, in step S4020, the acquisition part 110 acquires the target value of uncertainty $U_T$ of the measurement item of the measurement apparatus 1. Since the operation of step S4020 has been described with reference to the operation of step S1020 of FIG. 5, the description thereof is omitted here.

Next, in step S4030, the estimation part 120 estimates the uncertainty of the measurement apparatus 1 with respect to the initial value of the measurement point. The estimation part 120 calculates the uncertainty M in the case of measuring the center-to-center distance L of the circles using the measurement points P1 to P8. For example, the estimation part 120 stores the estimated uncertainty in the storage part 150.

Next, in step S4040, the estimation part 120 calculates the ratio of a variation amount of the uncertainty estimation results of the measurement apparatus 1 with respect to the variation amount of one measurement point if the arrangement of the one measurement point is changed. For example, as described with reference to FIG. 9, the estimation part 120 calculates the sensitivity $\Delta M_1/\Delta p_1$ with respect to the measurement point P1.

Next, in step S4050, the determination part 130 determines whether or not to adopt one measurement point on the basis of the target value and the calculated ratio. For example, if the sensitivity $\Delta M_1/\Delta p_1$ is less than a predetermined threshold, the determination part 130 causes the estimation part 120 to estimate the uncertainty in the measurement using the measurement points P2 to P8 excluding the measurement point P1. Then, in response to the estimation result of the estimation part 120 becoming less than the target value, the determination part 130 determines that the measurement point P1 is not to be used for the measurement. Further, for example, when the sensitivity $\Delta M_1/\Delta p_1$ becomes equal to or greater than the predetermined threshold, or when the measurement result using the measurement points P2 to P8 becomes equal to or greater than the target value, the determination part 130 determines that the measurement point P1 is to be used for the measurement.

The operations of steps S4040 and S4050 are then repeated for the other measurement points in a loop of steps S4032 to S4034. As a result, the determination part 130 may determine whether or not to use each of the measurement points P1 to P8 for measurement.

Next, in step S4060, the output part 140 outputs the number and the arrangement of measurement points determined by the determination part 130. The output part 140 displays the number and the arrangement of measurement points on a display or the like. Since the operation of the output part 140 is the same as the operation described with reference to step S1060 of FIG. 5, the description thereof is omitted here.

As described above, since the measurement point determination apparatus 100 determines whether or not to use the measurement point for the measurement on the basis of the sensitivity of the measurement point, the number and the arrangement of measurement points may be determined more precisely. In the operation of the fourth example, an example in which the sensitivity is calculated for each of the measurement points to determine whether or not to use the measurement point for the measurement has been described, but the present invention is not limited thereto. The measurement point determination apparatus 100 may determine whether or not to use each of the measurement points for the measurement after calculating all of the sensitivities of the measurement points. In this case, the determination part 130 may determine whether or not to adopt the measurement points in ascending order of sensitivity, and after determining to adopt one measurement point, the determination part 130 may determine to use all the remaining measurement points for the measurement.

Figure 11:
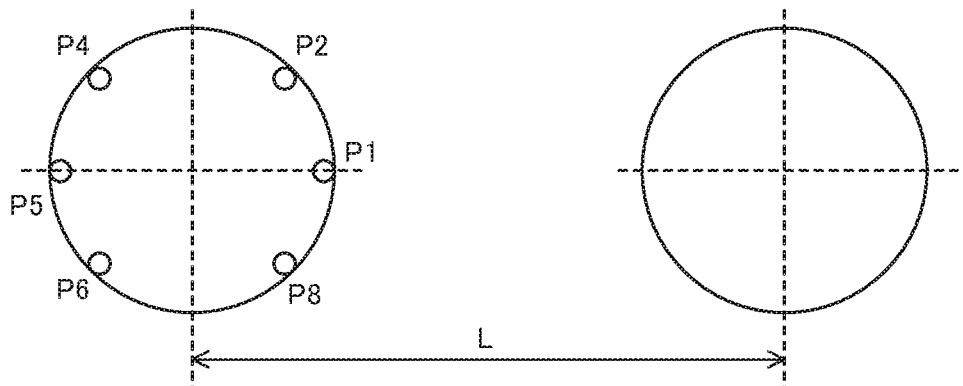
FIG. 11 shows an example of a result of the measurement point reduction by the measurement point determination apparatus 100 according to the embodiment.

FIG. 11 shows an example of a result of the measurement point reduction by the measurement point determination apparatus 100 according to the embodiment. FIG. 11 shows an example in which it is determined that the measurement points P3 and P7 are not to be used for the measurement and removed from the arrangement of measurement points shown in FIG. 8. In this manner, the measurement point determination apparatus 100 may further reduce the number of measurement points within a range satisfying the target value by using the sensitivity.

An example in which the measurement point determination apparatus 100 according to the embodiment reduces the number of measurement points on the basis of the sensitivity has been described above, but the present invention is not limited to thereto. The measurement point determination apparatus 100 may change the arrangement of measurement points. The operation of such a measurement point determination apparatus 100 will be described below.

[Fifth Example of Operation of Measurement Point Determining Apparatus]

Figure 12:
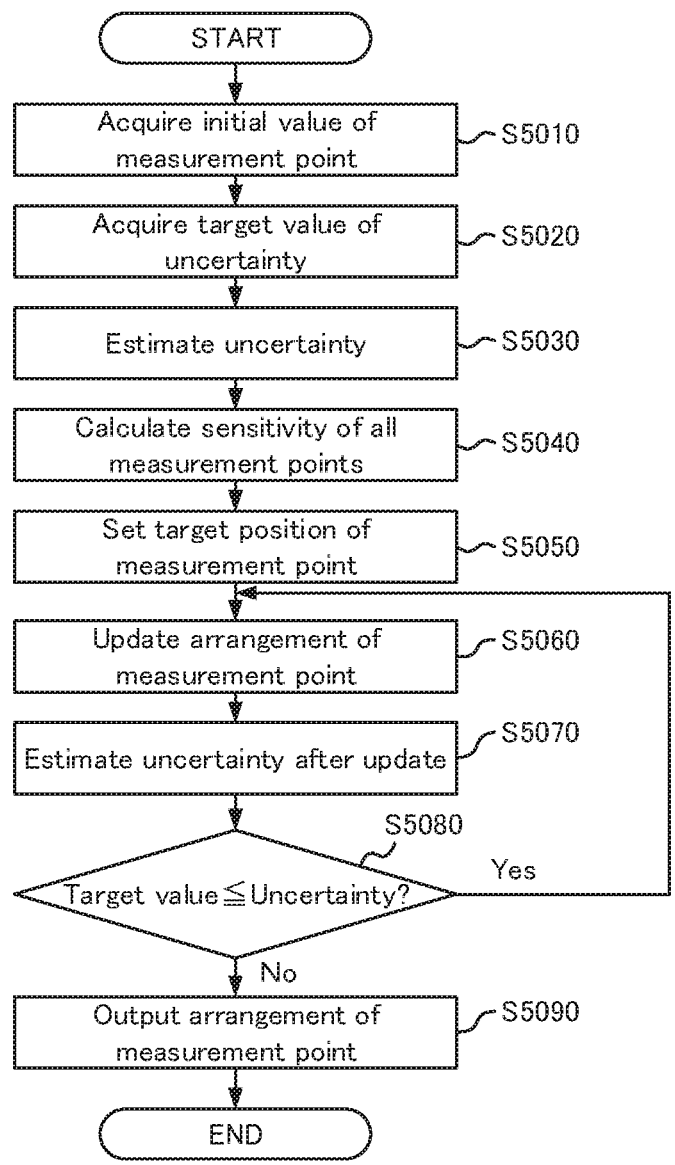
FIG. 12 shows a flowchart illustrating a fifth example of the operation of the measurement point determination apparatus 100 according to the embodiment.

FIG. 12 shows a flowchart illustrating a fifth example of the operation of the measurement point determination apparatus 100 according to the embodiment. FIG. 12 shows an operation for determining the arrangement of measurement points in a case where the measurement point determination apparatus 100 measures the center-to-center distance L of the circles as illustrated in FIG. 8.

First, in step S5010, the acquisition part 110 acquires the initial values of the number and the arrangement of measurement points. Next, in step S5020, the acquisition part 110 acquires the target value of uncertainty $U_T$ of the measurement item of the measurement apparatus 1. Next, in step S5030, the estimation part 120 estimates the uncertainty of the measurement apparatus 1 with respect to the initial value of the measurement point. Next, in step S5040, the estimation part 120 calculates the ratio of the variation amount of the uncertainty estimation results of the measurement apparatus 1 with respect to the variation amount of one measurement point when the arrangement of the one measurement point is changed.

Since the operations from steps S5010 to S5040 have been described with reference to the operations from steps S4010 to S4040 of FIG. 10, their descriptions are omitted here. An example in which the estimation part 120 calculates the sensitivity $\Delta M_i/\Delta p_i$ for the measurement points P1 to P8 (i=1, 2, 3, . . . , 8) in the operation of step S5040 will be described.

Next, the determination part 130 determines whether or not to change the arrangement of the one measurement point on the basis of the target value and the calculated ratio. The operation of the fifth example illustrates a case where the determination part 130 determines whether or not to change the arrangement in order from the measurement point having the maximum sensitivity among the measurement points. In step S5050, since the sensitivities of the measurement points P1 and P5 are the largest, the determination part 130 sets the positions of the measurement points P1 and P5 as target positions without changing the arrangement of the measurement points P1 and P5.

Next, in step S5060, the determination part 130 updates the arrangement of the measurement points. The determination part 130 changes the position of the measurement point having the next largest sensitivity in a manner to approach the target position. For example, the determination part 130 changes the positions of the measurement points P2, P4, P6, and P8. In this case, the determination part 130 moves the measurement points in the circumferential direction along the contour of the circle. For example, the determination part 130 moves each measurement point by a predetermined distance.

Next, in step S5070, the estimation part 120 estimates the uncertainty in the measurement with respect to the updated measurement point. Next, in step S5080, the determination part 130 returns to step S5060 in response to the estimation results of the estimation part 120 becoming equal to or larger than the target value (S5080: Yes), and moves the measurement point having the next largest sensitivity.

The estimation part 120 and the determination part 130 repeat steps S5060 and S5070 until the uncertainty in the measurement is less than the target value. If the uncertainty is equal to or larger than the target value even after all of the measurement points other than the measurement point set as the target position are moved, the positions of the measurement points may be moved again in descending order of sensitivity. That is, the measurement point determination apparatus 100 sequentially moves the measurement points by a predetermined distance. The measurement point determination apparatus 100 may discontinue the operation and notify the user or the like if the uncertainty is not less than the target value even after the repetition is performed a predetermined number of times or more. The determination part 130 determines the arrangement of all of the measurement points in response to the estimation result of the estimation part 120 becoming less than the target value (S5080: No).

Next, in step S5090, the output part 140 outputs the number and the arrangement of the measurement points determined by the determination part 130. The output part 140 displays the number and the arrangement of the measurement points on the display or the like. Since the operation of the output part 140 is the same as the operation described with reference to step S1060 of FIG. 5, the description thereof is omitted here.

As described above, the measurement point determination apparatus 100 may determine the arrangement of measurement points that is optimal for measurement of the measurement apparatus 1. In this manner, the measurement point determination apparatus 100 may determine the arrangement of measurement points independently of the number of measurement points, so that the arrangement of measurement points may be determined more precisely.

Figure 13:
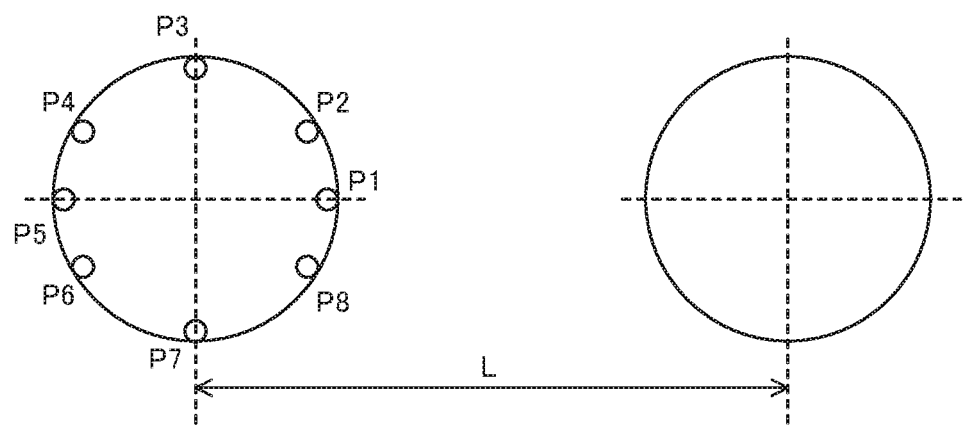
FIG. 13 shows an example of a result of the arrangement of measurement points moved by the measurement point determination apparatus 100 according to the embodiment.

FIG. 13 shows an example of a result of the arrangement of measurement points moved by the measurement point determination apparatus 100 according to the embodiment. FIG. 13 shows an example in which the measurement points P2, P4, P6, and P8 are moved in the direction of the measurement point P3 or P7 from the arrangement of measurement points shown in FIG. 8. In this manner, by using the sensitivity, the measurement point determination apparatus 100 may change the arrangement of measurement points so as to satisfy the target value.

The first to fifth examples have been described as examples of the operation of the measurement point determination apparatus 100 according to the embodiment, but the operation of the measurement point determination apparatus 100 is not limited to these. The measurement point determination apparatus 100 may combine the first to fifth examples as appropriate. For example, the measurement point determination apparatus 100 may determine the number of measurement points of the measurement apparatus 1 by any of the operations of the first example to the third example, and then may perform the operation of the fourth example or the fifth example.

In this case, for example, the measurement point determination apparatus 100 sets the target value in the case of executing the operation of the fourth example or the fifth example as a higher target value than the target value in the case of executing any of the operations of the first example to the third example. Setting the higher target value is, for example, making a target value smaller when the relationship of the uncertainty to the number of measurement points monotonously decreases. The measurement point determination apparatus 100 may more efficiently determine the number and the arrangement of measurement points with higher accuracy by the operation of such a combination.

Examples in which the measurement point determination apparatus 100 according to the embodiment determines the number and the arrangement of measurement points for the circle measurement have been described above, but the present invention is not limited to this. The measurement point determination apparatus 100 may determine the number and the arrangement of measurement points in the same manner even in a measurement of a geometry other than a circle. For example, when the geometry to be measured by the user is a simple geometry for which measurement points can be set, a similar operation can be performed.

For example, in the operation of the first example, the fewest number of measurement points capable of measuring the geometry to be measured by the user or the predetermined initial number of measurement points is set as the minimum value $n_{min}$ of the number of measurement points. The number of points determined in advance as the largest or the maximum value for measuring the geometry is defined as the maximum value $n_{max}$ of the number of measurement points. Then, by calculating the uncertainty in the measurement of the geometry with respect to the numbers of measurement points between the minimum value $n_{min}$ and the maximum value $n_{max}$, the number of measurement points $n_T$ satisfying the target value of uncertainty $U_T$ may be easily determined.

As described above, in the case of measuring a relatively simple geometry such as a circle or a line, the measurement points may be uniformly arranged. Further, in the case of measuring a geometry that is more complex than a circle or a line, such as a surface, a cylinder, or a sphere, the measurement points may not be uniformly arranged. In addition, in the case of measuring more complex geometries, the object to be measured may be divided into geometry elements and the measurement point determination apparatus 100 according to the embodiment may be applied to one or more geometry elements respectively.

The present invention is described on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A measurement point determination method for determining a number or an arrangement of measurement points for a coordinate measuring machine that performs measurement processing of a three-dimensional geometry of an object at a plurality of measurement points, the method comprising:
    obtaining and storing in a memory of a computer an initial value of the number and an arrangement of measurement points;
    obtaining and storing in the memory a target value of the uncertainty of a measurement result of the three-dimensional geometry of the object by the coordinate measuring machine;
    estimating the uncertainty of the measurement result of the three-dimensional geometry of the object by the coordinate measuring machine that uses the initial value of the number and the arrangement of the measurement points;
    calculating a ratio $\Delta M/\Delta p$ which is the result of dividing a variation amount $\Delta M$ in the estimation results of the uncertainty of the measurement result of the three-dimensional geometry of the object by the coordinate measuring machine by a variation amount $\Delta p$ of one measurement point among the measurement points corresponding to the initial value of the number and the arrangement when the arrangement of the one measurement point is changed for every measurement point;
    updating the measurement points by moving the arrangement of at least one measurement point to approach to a target position for a predetermined distance, the target position being the position of the measurement point for which the ratio $\Delta M/\Delta p$ is the maximum among the measurement points corresponding to the initial value of the number and the arrangement;
    determining the arrangement of measurement points used by the coordinate measuring machine to be the updated measurement points if the estimation results of the uncertainty of the measurement result of the three-dimensional geometry of the object by the coordinate measuring machine using the updated measurement points is less than the target value; and
    the coordinate measuring machine measuring the three-dimensional geometry of the object by using the determined measurement points,
    wherein the variation amount $\Delta p$ of the one measurement point is a distance between a first location and a second location, the first location being the location of the one measurement point before the one measurement point is changed, the second location being the location of the one measurement point after the one measurement point is changed; and
    the variation amount $\Delta M$ in the estimation results is a difference between a first estimation results of the uncertainty and a second estimation results of the uncertainty, the first estimation results of the uncertainty being the estimation results before the one measurement point is changed, the second estimation results of the uncertainty being the estimation results after the one measurement point is changed.

2. The measurement point determination method according to claim 1, further comprising, before the obtaining and storing the initial value of the number and the arrangement of the memory points in the memory:
    obtaining and storing in the memory a minimum value and a maximum value of the number of measurement points;
    obtaining and storing in the memory a target value of uncertainty of the measurement result by the coordinate measuring machine;
    estimating uncertainties of the measurement result when the three-dimensional geometry of the object is measured by the coordinate measuring machine using two or more of the numbers of measurement points between the minimum value and the maximum value of the number of measurement points; and
    determining the number of measurement points of the coordinate measuring machine on the basis of the target value and the estimated uncertainties.

3. The measurement point determination method according to claim 2, wherein
    the estimating uncertainties estimates the uncertainties for all of the numbers of measurement points between the minimum value and the maximum value of the number of measurement points, and
    the determining the number of measurement points determines the number of measurement points of the coordinate measuring machine to be the fewest number of measurement points for which the uncertainty falls below the target value.

4. The measurement point determination method according to claim 2, wherein
the determining the number of measurement points determines whether to determine the number of measurement points of the coordinate measuring machine or to continue to estimate the uncertainty for a further different number of measurement points each time after estimating the uncertainty for one of the numbers of measurement points among the numbers of measuring points in the estimating uncertainties.

5. The measurement point determination method according to claim 2, wherein
the estimating the uncertainty estimates the uncertainty by increasing or decreasing the number of measurement points from the minimum value to the maximum value of the number of measurement points at a first interval of the number of points.

6. The measurement point determination method according to claim 5, wherein
the determining the number of measurement points determines whether to continue estimating the uncertainty with respect to the further different number of measurement points using the first interval of the number of points, or to continue estimating the uncertainty with respect to the further different number of measurement points using a second interval of the number of points having a smaller margin than the first interval of the number of points, each time the uncertainty is estimated with respect to the one of the number of measurement points among the plurality of numbers of measurement points, wherein
the estimating the uncertainty estimates the uncertainty by increasing or decreasing the previous number of measurement points at the interval of the number of points determined in the determining the number of measurement points.

7. A non-transitory storage medium storing a program for causing a computer to perform the method according to claim 1.

8. A measurement point determination apparatus for determining a number or an arrangement of measurement points for a coordinate measuring machine that performs measurement processing of a three-dimensional geometry of an object at a plurality of measurement points, the apparatus comprising:
a memory of a computer that stores an initial value of the number, an arrangement of measurement points, and a target value of the uncertainty of a measurement result of the three-dimensional geometry of the object by the coordinate measuring machine;
estimation circuitry configured to estimate the uncertainty of the measurement result of the three-dimensional geometry of the object by the coordinate measuring machine that uses to the initial value of the number and the arrangement of the measurement points;
calculation circuitry configured to calculate a ratio $\Delta M/\Delta p$ which is the result of dividing a variation amount $\Delta M$ in the estimation results of the uncertainty of the measurement result of the three-dimensional geometry of the object by the coordinate measuring machine by a variation amount $\Delta p$ of one measurement point among the measurement points corresponding to the initial value of the number and the arrangement when the arrangement of the one measurement point is changed for every measurement point;
updating circuitry configured to update the measurement points by moving the arrangement of at least one measurement point to approach to a target position for a predetermined distance, the target position being the position of the measurement point for which the ratio $\Delta M/\Delta p$ is the maximum among the measurement points corresponding to the initial value of the number and the arrangement;
determination circuitry configured to determine the arrangement of measurement points used by the coordinate measuring machine to be the updated measurement points if the estimation results of the uncertainty of the measurement result of the three-dimensional geometry of the object by the coordinate measuring machine using the updated measurement points is less than the target value, and
output circuitry configured to output information of the determined measurement points to the coordinate measuring machine to measure the three-dimensional geometry of the object by using the determined measurement points by the coordinate measuring machine,
wherein the variation amount $\Delta p$ of the one measurement point is a distance between a first location and a second location, the first location being the location of the one measurement point before the one measurement point is changed, the second location being the location of the one measurement point after the one measurement point is changed; and
the variation amount $\Delta M$ in the estimation results is a difference between a first estimation results of the uncertainty and a second estimation results of the uncertainty, the first estimation results of the uncertainty being the estimation results before the one measurement point is changed, the second estimation results of the uncertainty being the estimation results after the one measurement point is changed.

* * * * *